US010801474B1

(12) United States Patent
Sukhija et al.

(10) Patent No.: US 10,801,474 B1
(45) Date of Patent: Oct. 13, 2020

(54) SUPPLEMENTING WIND POWER FOR DRIVING WIND TURBINES

(71) Applicant: International Business Machines Corporation, Armonk, NY (US)

(72) Inventors: Sandeep Sukhija, Rajasthan (IN); Bryan Sacks, Markham (CA); Deepak Bajaj, Reading (GB); Harish Bharti, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/797,720

(22) Filed: Feb. 21, 2020

(51) Int. Cl.
*F03D 7/00* (2006.01)
*F03D 17/00* (2016.01)
*F03D 7/02* (2006.01)
*F03D 7/04* (2006.01)

(52) U.S. Cl.
CPC ........... *F03D 17/00* (2016.05); *F03D 7/0224* (2013.01); *F03D 7/0204* (2013.01); *F03D 7/047* (2013.01); *F05B 2240/96* (2013.01); *F05B 2260/821* (2013.01); *F05B 2270/1033* (2013.01); *F05B 2270/32* (2013.01); *F05B 2270/321* (2013.01)

(58) Field of Classification Search
CPC ...... F03D 17/00; F03D 7/0224; F03D 7/0204; F03D 7/047; F05B 2240/96; F05B 2270/1033; F05B 2270/32; F05B 2270/321; F05B 2260/821; G05D 7/00; G05D 9/00; G05D 13/00; G05D 17/00; H02J 2300/28

USPC .............................. 290/44, 55; 700/286, 287
See application file for complete search history.

(56) References Cited

U.S. PATENT DOCUMENTS

| 7,230,348 B2* | 6/2007 | Poole ........................ F03D 7/06 290/55 |
| 7,875,990 B2* | 1/2011 | Wang ........................ F03D 9/17 290/43 |
| 10,280,900 B1 | 5/2019 | Krippene |
| 2007/0102938 A1* | 5/2007 | Poole ........................ F03D 7/06 290/55 |
| 2008/0157528 A1* | 7/2008 | Wang ...................... F03D 13/20 290/43 |

(Continued)

FOREIGN PATENT DOCUMENTS

| CN | 202280578 U | 6/2012 |
| CN | 102748256 A | 10/2012 |
| CN | 108386312 A | 8/2018 |

*Primary Examiner* — Tulsidas C Patel
*Assistant Examiner* — S. Mikailoff
(74) *Attorney, Agent, or Firm* — Garg Law Firm, PLLC; Rakesh Garg; Michael O'Keefe

(57) ABSTRACT

An embodiment includes sensor data representative of an amount of gas in a storage tank and a speed of wind driving a wind turbine. The embodiment also includes identifying a favorable capacity condition of the storage tank by comparing the amount of gas in the storage tank to the tank's capacity. The embodiment further includes identifying a favorable wind condition by comparing the wind speed to a cut-in speed of the wind turbine. In addition, the embodiment includes receiving wind direction data indicating a direction of the wind driving the wind turbine and identifying a valve position update for a valve that controls gas flow from the tank towards the wind turbine. Finally, the embodiment includes instructing the valve according to the valve position update.

20 Claims, 5 Drawing Sheets

(56) References Cited

U.S. PATENT DOCUMENTS

2011/0187119 A1* 8/2011 McMaster ............... F03D 9/007
                                                                                  290/55

* cited by examiner

SUPPLEMENTING WIND POWER FOR DRIVING WIND TURBINES

TECHNICAL FIELD

The present invention relates generally to a method, system, and computer program product for wind turbine management. More particularly, the present invention relates to a method, system, and computer program product for supplementing wind power for driving wind turbines.

BACKGROUND

Windmills and wind turbines have a long history of harnessing wind power and converting the wind's energy for another use. Windmills have been used for many centuries for work such as grinding grain or pumping water. Wind turbines were introduced in the late $19^{th}$ century for using wind power to generate electricity. Today, wind turbines are in widespread use and the number of wind turbines in use continues to grow. Modern wind turbines range from individual home-use wind turbines that generate hundreds of watts of electricity to wind farms of various sizes that generate hundreds or thousands of megawatts of electricity. Wind farms generate electricity that contributes to an electrical grid servicing a municipality or region encompassing several municipalities. Homeowners who install wind turbines usually do so to reduce their reliance on an electricity provider and expense involved with the electrical service, as well as to secure a source of backup power during power grid failures.

SUMMARY

The illustrative embodiments provide for supplementing wind power for driving wind turbines. An embodiment includes receiving, by a processor, gas sensor data from a gas sensor that senses gas in a gas storage tank, wherein the gas sensor data describes an amount of gas in the gas storage tank. The embodiment also includes, in response to receiving the gas sensor data from the gas sensor, identifying, by the processor, a favorable capacity condition of the gas storage tank by comparing the amount of gas in the gas storage tank to a tank capacity threshold value and, based on the comparing of the amount of gas to the threshold value, generating favorable capacity indicator data indicative of the favorable capacity condition of the gas storage tank. The embodiment also includes receiving, by the processor, wind speed data from a wind speed sensor that senses a speed of outside wind driving a wind turbine, wherein the wind speed data describes the speed of the outside wind. The embodiment also includes, in response to receiving the wind speed data from the wind speed sensor, identifying, by the processor, a favorable wind condition of the outside wind by comparing the outside wind speed to a cut-in speed of the wind turbine and, based on the comparing of the wind speed to the cut-in speed, generating favorable wind indicator data indicative of the favorable wind condition of the outside wind. The embodiment also includes receiving, by the processor, wind direction data from a wind direction sensor that senses a direction of the outside wind, wherein the wind direction data describes the direction of the outside wind. The embodiment also includes, in response to identifying the favorable capacity condition of the gas storage tank, identifying the favorable wind condition of the outside wind, and receiving the wind direction data from the wind direction sensor, identifying, by the processor, a valve position update for a valve that controls a flow of gas from the gas storage tank, wherein the valve position update is generated by comparing a current valve position of the valve to a target valve position associated with the direction of the outside wind and, based on the comparing of the current valve position to the target valve position, generating valve position update data indicative of the valve position update for the valve. The embodiment also includes, in response to identifying valve position update for the valve, instructing, by the processor, the valve to move to the target valve position. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
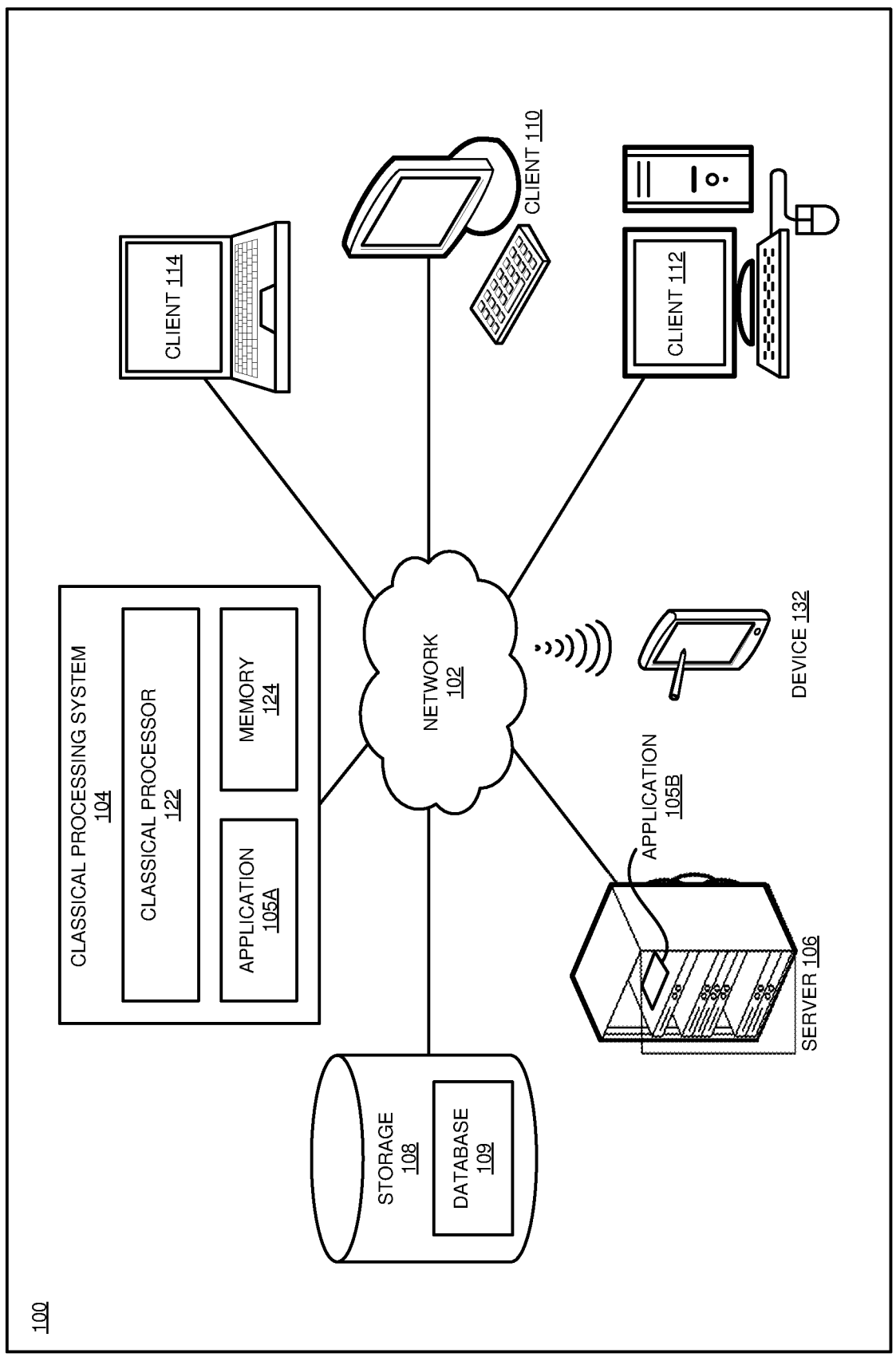
FIG. 1 depicts a block diagram of a network of data processing systems in which illustrative embodiments may be implemented.

There are two main types of wind turbines: horizontal axis wind turbines (HAWT) and vertical axis wind turbines (VAWT). Both types of wind turbines operate according to the same general principles. During windy conditions, blades on the wind turbine are impacted by passing air and are shaped in such a way to cause a turbine shaft connected to the blades to rotate. The turbine shaft is mechanically connected to a turbine generator such that the rotation of the turbine shaft becomes a mechanical energy input to the turbine generator. The turbine generator converts the mechanical energy to electricity.

The turbine shaft does not rotate, and electricity is not generated during still conditions or when there is only very slight air movement. The lower threshold wind speed required to begin moving the blades is referred to as the start-up speed and it varies from one wind turbine to another.

The start-up speed is the minimum wind speed needed for the blades and turbine shaft to begin moving, but there is not enough torque on the turbine shaft for driving the turbine generator to generate electricity. The lower threshold wind speed required to cause the turbine to begin generating electricity is referred to as the cut-in speed, which also varies from one wind turbine to another.

Thus, during times when the wind speed is not steadily remaining at or above the cut-in speed, some wind turbines remain idle and no electricity is generated. Alternatively, some wind turbines use the turbine generator as an electric motor to rotate the turbine shaft as a way of supplementing the wind to overcome inertia and rotate the blades. As a result, during extended periods of little or no wind, wind turbines provide no electricity, and in some cases consume electricity during repeated efforts to drive the blades to an electricity-producing state.

The illustrative embodiments recognize that the output of a wind turbine depends on the percentage of time spent generating electricity and is reduced by any electricity consumed by the wind turbine. For example, typical cut-in values for current wind turbines are 7 miles per hour (mph) to 9 mph, which includes values that exceed the average daily windspeed for many areas that average, for example, 6 mph to 8 mph. The illustrative embodiments also recognize that such areas have many periods of time during which the windspeed is close to the cut-in speed value of a wind turbine, for example within 1 or 2 mph of the cut-in speed. The illustrative embodiments further recognize that systems exist to supplement wind power when wind speed is close to cut-in speed by using the generator as a motor to temporarily drive the turbine shaft, but such systems require the consumption of electricity.

The illustrative embodiments used to describe the invention generally address and solve the above-described problem of periods of time during which wind speed is close to the speed needed to drive a wind turbine to generate electricity, but still below the cut-in speed. Systems exist to supplement the wind power, but such systems consume electricity, and a better solution would supplement the wind power without consuming electricity or other valuable resources.

The illustrative embodiments recognize that by storing "waste gases" normally emitted into the atmosphere, the stored gases can be released and directed in generally the same direction as the wind direction towards the nose of wind turbine and thereby used as a supplementary wind source that only uses "waste" resources rather than electricity or other valuable resources. While the direction of the waste gases is most effective when aligned with the wind direction with the nose of the wind turbine facing against the wind (for simplification, the present description treats the wind turbine as facing the wind, in other words, rotated to a position where the nose of the wind turbine is facing a direction that is exactly opposite the wind direction, e.g., if the wind is moving exactly towards the east, the nose of the wind turbine is facing exactly west), the waste gases are still effective for supplementing the force of the wind when directed any angle less than 90 degrees from the wind direction, but, in general, the force contributed by the waste gases decreases as the angle from the wind direction increases by the cosine of the angle according to expression (1) below.

$$F_T = F_G \cos(\theta) \tag{1}$$

In expression (1), $F_G$ is the force of the exhaust gases, $\theta$ is the angle between the wind direction and the flow of waste gases, and $F_T$ is the force applied to the wind turbine.

The term "waste gas" or "gas" as used herein refers to any gaseous substance, and includes exhaust released from various systems during operation, such as smoke, fumes, steam, or heated air. As a non-limiting example, in a residential environment, sources of heated waste gas include exhaust from a fireplace chimney, exhaust from a heating, ventilation and air conditioning (HVAC) system, exhaust from a boiler or furnace, heated air from washrooms, and airborne grease, combustion products, fumes, smoke, heat, and steam from an oven vent.

In some embodiments, a system and method for supplementing wind power for driving a wind turbine include receiving sensor data, processing the sensor data to determine whether conditions are favorable for supplementing wind power, and if conditions are determined to be favorable, determining which exhaust valves to open and which to close to control the direction of exhaust gases flowing from a gas storage tank. For example, in an embodiment, the application checks an internal temperature of the gas storage tank and determines whether the temperature is at or above a threshold temperature. In an embodiment, if the gases in the storage tank are cool, then heated gas will flow up to the tank, whereas if the gases in the storage tank are hot, then the hot gas from the tank will flow up out of the tank. Thus, if the application determines that the temperature is at or below the threshold temperature, the application the application allows waste gases to accumulate in the storage tank from various sources available in a residential or commercial building, for example from an HVAC system, a fireplace chimney, and from exhaust gases from washrooms.

In an embodiment, the gas storage tank is equipped with capacity and wind direction sensors, and a specific valve, pair of valves, or group of valves will be opened based on the wind direction. For example, if the wind direction is from east to west, only the valve or valves that allow exhaust gases to move generally east to west will be opened. Thus, in an embodiment, the application performs a series of checks on tank capacity, wind speed, and wind direction to determine if favorable conditions exist to use the waste gas to supplement wind to drive the wind turbine. More specifically, the application checks tank capacity. If the current level of gas is at a dangerously high level, the application forgoes the wind speed check and proceeds to open one or more of the vents.

In some embodiments, the application checks wind speed and determines whether the wind speed is in a preset range. For example, in some embodiments, the preset range of wind speeds includes wind speeds below the cut-in speeds by a gas compensation value, where the gas compensation value is the increase in effective wind speed when the actual wind speed is combined with gas from the storage tank. In a non-limiting example, a wind turbine has a cut-in speed of 10 mph and the waste gas compensation value is 4 mph for that particular wind turbine, so preset range of speeds is the cut-in speed (10 mph) to a wind speed that is equal to the cut-in speed reduced by the gas compensation value (10 mph–4 mph=6 mph) resulting in a preset range of 6 mph to 10 mph. In an embodiment, the preset range can include only a lower value for a system where the gas is used to supplement wind speed even when the wind speed already exceeds the cut-in speed, for example where the preset range is 6 mph or higher. In an embodiment, the preset range can include only an upper value for a system where the gas is used to supplement wind speed even during still conditions (i.e., wind speed=0 mph), for example where the preset range is any wind speed up to and including 10 mph.

In an embodiment, if the wind speed is not in the preset range, the application determines that favorable conditions do not exist to use the waste gas to supplement wind to drive the wind turbine, so the application starts the process over again. Otherwise, in an embodiment, if the wind speed is in the preset range, the application determines that favorable conditions do exist to use the waste gas to supplement wind to drive the wind turbine, so the application continues the process.

In some embodiments, at the application checks wind direction. Next, the application determines new valve positions. In some embodiments, each valve has a fixed exhaust direction, which is the direction that gas flows when exiting through the respective valve. For example, in an embodiment, the exhaust directions are 0°, 90°, 180°, and 270°. In some such embodiments, the application identifies a valve or pair of valves for which the difference between wind direction and the exhaust direction is less than 90°. In some embodiments, the application also determines a percentage-open for the valves rather than just full open or full closed. For example, in an embodiment, the application calculates a percentage-open value for each valve based on parameters such as wind speed, tank temperature, tank capacity, and angle between exhaust direction and wind direction. In some embodiments, the application uses a machine-learning model to receive various parameter values, such as wind speed, tank temperature, tank capacity, and angle between exhaust direction and wind direction, as well as other values such as humidity, blade pitch, and atmospheric pressure, as well as historic data regarding the rate at which gases in the tank are replenished, and predicts an percentage-open value for each valve. Thus, the application designates the identified valves as valves to open and designates the remaining valves as valves to close. Finally, the application issues control signals to each of the valves to move the valves to the designated open or closed positions. The application then starts the process over again.

Also, in the illustrated embodiment, the application receives a user-initiated event in the form of user inputs for monitoring and controlling the wind turbine management application. For example, in an embodiment, user-initiated events include inputs from a user for adjusting settings and parameters, initiating test sequences, and forcing the valve position decision module to perform tasks, for example opening valves to flush the tank or closing valves to build pressure in the tank.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
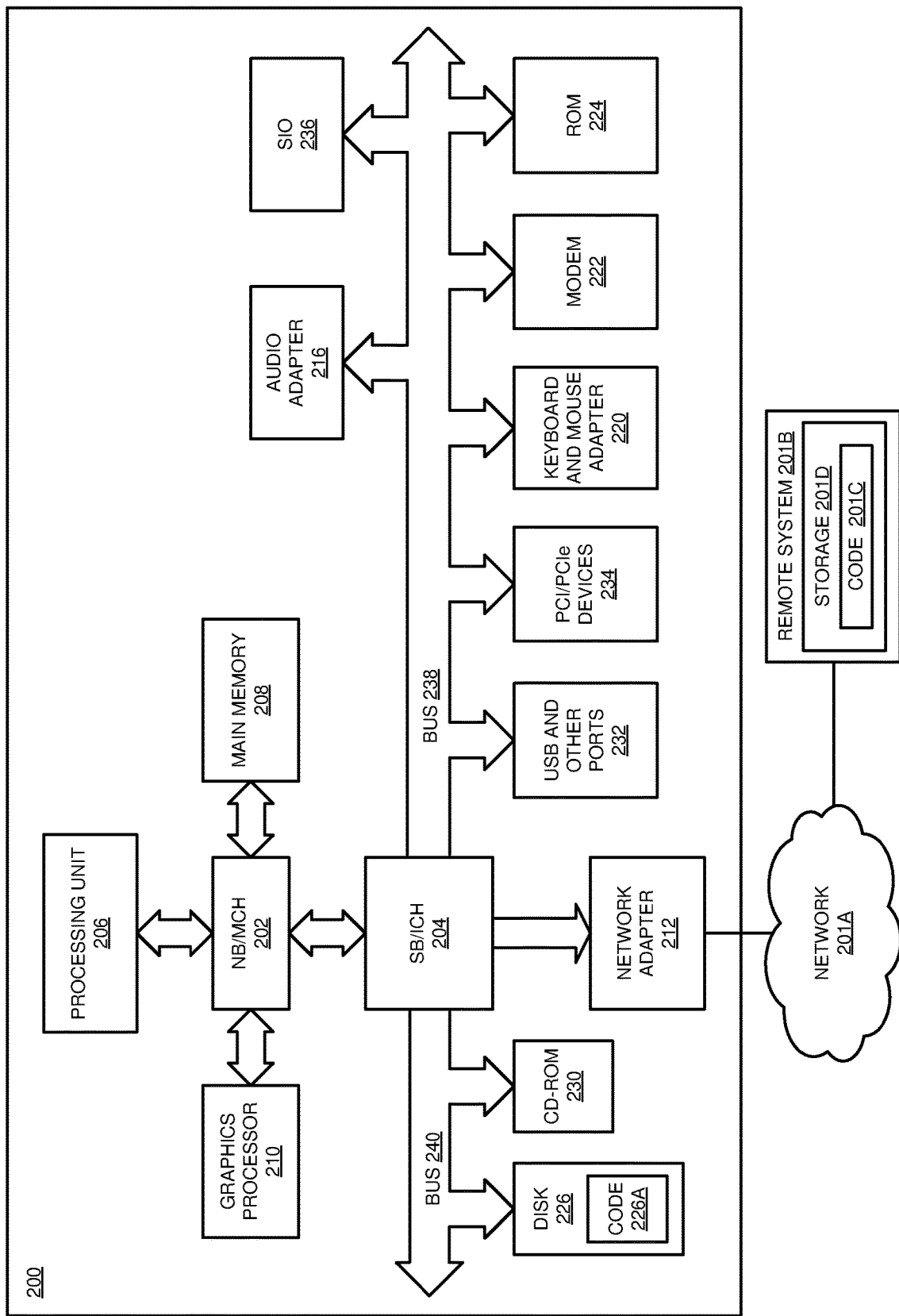
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more processing tasks by application 105B such as initiating processes described herein. Any software application described as executing in another conventional processing system in FIG. 1 can be configured to execute in device 132 in a similar manner. Any data or information stored or produced in another conventional processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of application 105A of processing system 104 and application 105B of server 106 implements an embodiment of an application as described herein. In a particular embodiment, the application is implemented using one of application 105A and application 105B within a single server or processing system. In another particular embodiment, the application is implemented using both application 105A and application 105B within a single server or processing system.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
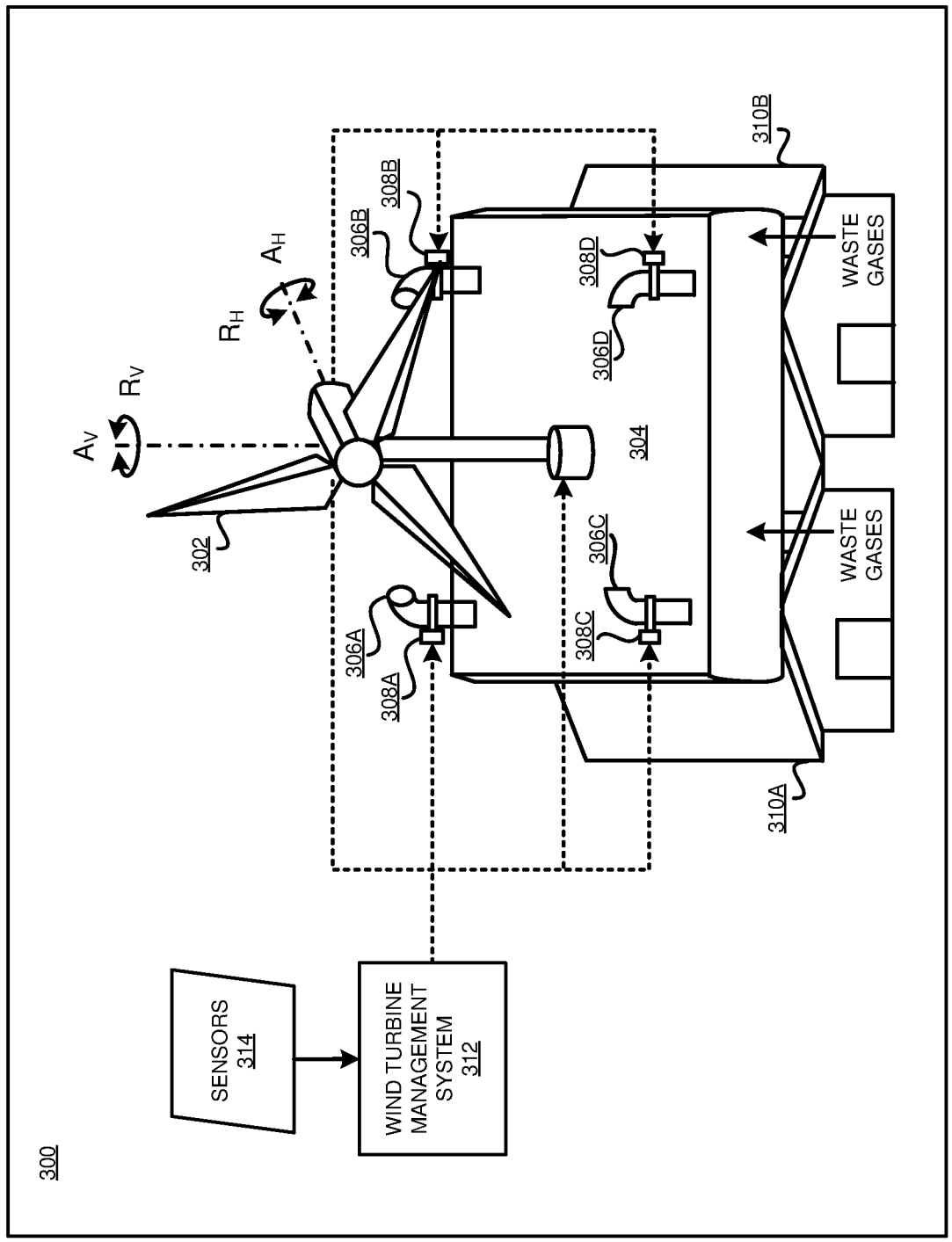
FIG. 3 depicts a perspective view of a system for supplementing wind power for driving wind turbines in accordance with an illustrative embodiment.

With reference to FIG. 3, this figure depicts a perspective view of a system 300 for supplementing wind power for driving a wind turbines in accordance with an illustrative embodiment. The illustrated embodiment includes a wind turbine 302 mounted on a gas storage tank 304. While the illustrated embodiment shows a horizontal axis wind turbine 302, alternative embodiments include a vertical axis wind turbine 302.

In the illustrated embodiment, the storage tank 304 includes a plurality of exhaust ports 306A-306D through which gas may exit the storage tank 304. In an embodiment, each of the ports 306A-306D includes a respective one of a plurality of valves 308A-308D for controlling the release of gas from the tank 304 through a respective port 306. In an embodiment, the valves 308 include an open position that allows gas to flow out a respective port 306 from within the tank 304 and a closed position that blocks gas to prevent gas from flowing out a respective port 306 from within the tank 304. In an embodiment, the valves 308 include one or more positions between open and closed that partially block gas flowing from within the tank 304 towards a respective port 306.

In the illustrated embodiment, storage tank 304 is positioned over one or more structures 310A and 310B. In an embodiment, the one or more structures 310 are houses or other types of buildings. In an embodiment, the storage tank 304 receives waste gas from the structures 310A and 310B. In an embodiment, the waste gases includes exhaust released from various systems during operation, such as smoke, fumes, steam, or heated air. As a non-limiting example, in a residential environment, sources of heated waste gas include exhaust from a fireplace chimney, exhaust from a heating, ventilation and air conditioning (HVAC) system, exhaust from a boiler or furnace, heated air from washrooms, and airborne grease, combustion products, fumes, smoke, heat, and steam from an oven vent.

In the illustrated embodiment, the system 300 includes a wind turbine management system 312 that controls the positions of the valves 306A-306D. In an embodiment, the wind turbine management system 312 includes a wind turbine management application 400 described below in connection with FIG. 4 that receives information from one or more sensors 314 and controls the positions of the valves 306A-306D based on the information received from the sensors 314. In an embodiment, the sensors 314 include one or more of a wind speed sensor, a wind direction sensor, and a temperature sensor. In an embodiment, the wind turbine management system 312 also controls the facing direction of the wind turbine 302 according to information received from one or more sensors 314, for example by driving the wind turbine 302 to rotate in directions indicated by arrows Rv about the turbine vertical axis Av.

In an embodiment, the wind turbine 302 includes blades that rotate a turbine shaft in the directions indicated by arrows $R_H$ about the turbine horizontal axis $A_H$ when driven by wind having a wind speed that is at or above the rated start-up speed for the turbine 302. The wind turbine 302 generates electricity when driven by wind that has a wind speed at or above a rated cut-in speed for the wind turbine 302. In an embodiment, when the wind speed is too low to drive the wind turbine 302 to generate electricity, the wind turbine management system 312 controls one or more valves 308 to open and allow gas to flow from a respective one of the ports 308 towards the wind turbine 302 in order to supplement the wind and allow the wind turbine 302 to generate electricity just as it would if the wind speed were higher.

Figure 4:
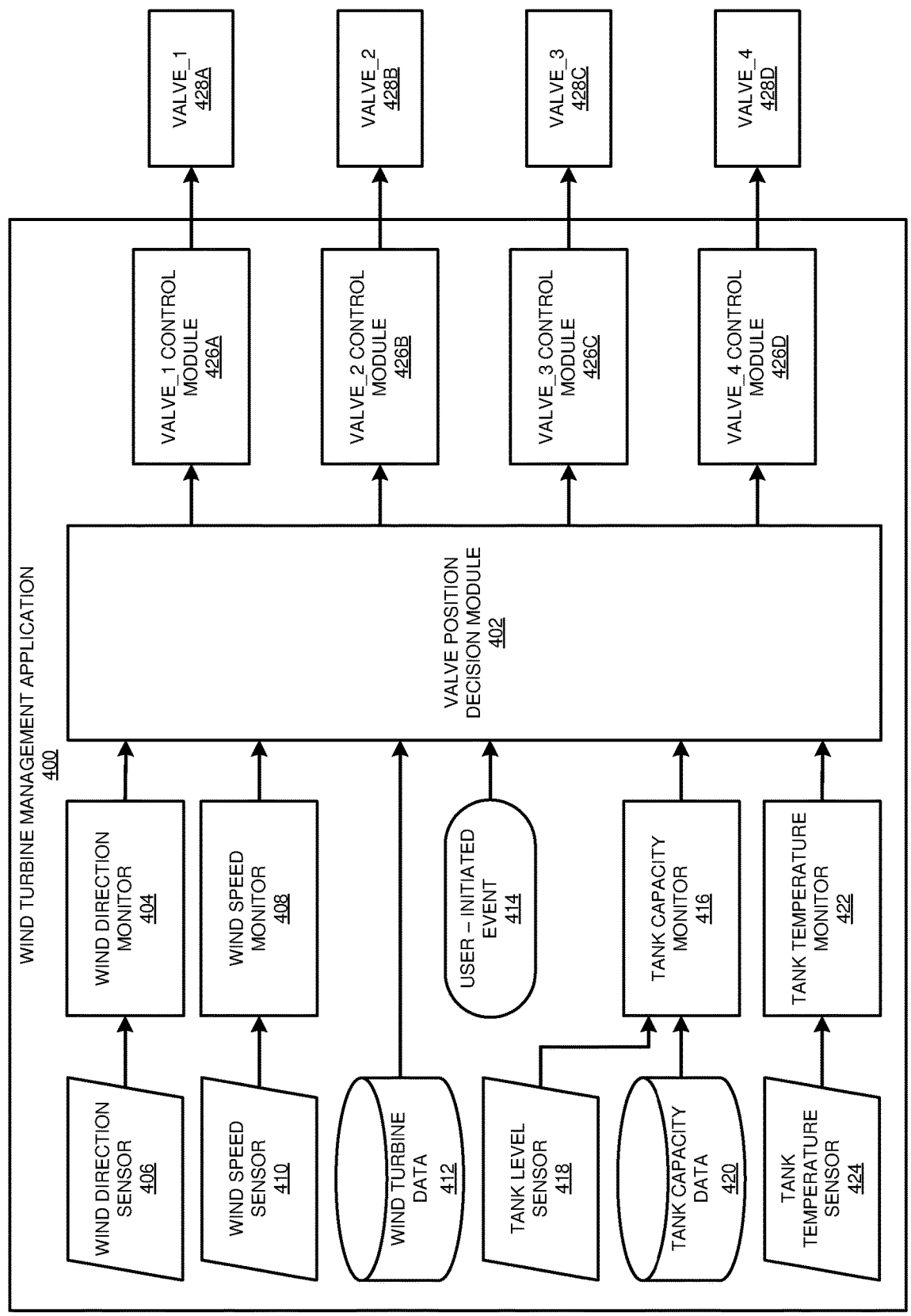
FIG. 4 depicts a block diagram of an exemplary system for supplementing wind power for driving wind turbines in accordance with an illustrative embodiment.

With reference to FIG. 4, this figure depicts a block diagram of a wind turbine management application 400 in accordance with an illustrative embodiment. In a particular embodiment, application 400 is an example of application 105A and/or 105B of FIG. 1.

In the illustrated embodiment, the application 400 includes a valve position decision module 402 that receives inputs from a wind direction monitor 404, a wind speed monitor 408, a tank capacity monitor 416, and a tank temperature monitor 422, as well as wind turbine data 412 and inputs generated by a user-initiated events 414. In the illustrated embodiment, the valve position decision module 402 processes the various inputs and outputs control signals to valve control modules 426A-426D, which drive respective valves 428A-428D. In an embodiment, the valves 428A-428D are examples of valves 308A-308D of FIG. 3.

In the illustrated embodiment, the application 400 receives sensor data from a plurality of sensors that is pre-processed by respective monitors for use by the valve position decision module 402 More specifically, the wind direction monitor 404 receives wind direction sensor data from a wind direction sensor 406; the wind speed monitor 408 receives wind speed sensor data from a wind speed sensor 410; the tank capacity monitor 416 receives tank capacity data from a tank level sensor 418 as well as tank capacity data 420 stored in electronic memory; and the tank temperature monitor 422 receives tank temperature data from a tank temperature sensor 424. In an embodiment, the wind direction monitor 404, wind speed monitor 408, tank capacity monitor 416, and tank temperature monitor 422 perform pre-processing of sensor data to prepare and provide it for use by the valve position decision module 402. In some embodiments, the pre-processing performed by the monitors 404, 408, 416, and 422 includes data filtering, normalization, and buffering using known techniques.

In some embodiments, the monitors 404, 408, 416, and 422 perform stream processing on incoming sensor data to monitor the data for designated events and notify the valve position decision module 402 when any of the designated events occur. In an embodiment, the wind direction monitor 404 monitors the wind direction sensor data for changes in wind direction and alerts the valve position decision module 402 when a change in wind direction occurs so that the valve position decision module 402 can determine if any changes need to be made to any of the positions of the valves 426A-426D.

In an embodiment, the wind speed monitor 408 monitors the wind speed sensor data for changes in wind speed and for designated wind speeds and alerts the valve position decision module 402 when a change in wind speed occurs or a designated wind speed occurs so that the valve position decision module 402 can determine if any changes need to be made to any of the positions of the valves 426A-426D. For example, in some embodiments, the designated wind speeds in the wind speed monitor 408 include the start-up and the cut-in speeds that match the ratings of the wind turbine. In some embodiments, the designated wind speeds in the wind speed monitor 408 include wind speeds below the start-up and the cut-in speeds by an amount that can be covered by the waste gas. In a non-limiting example, a wind turbine has a cut-in speed of 10 mph and the waste gas can compensate for 4 mph for that particular wind turbine, so the wind speed monitor 408 alerts the valve position decision module 402 when the wind speed reaches 6 mph, thereby alerting the valve position decision module 402 to favorable wind speed conditions for using the waste gas to supplement the wind driving the wind turbine. The start-up and cut-in speeds, and the speeds below the start-up and cut-in speeds at which the waste gas can make up the difference vary and are largely very implementation-specific values that can be determined through direct measurement as part of an installation process and will also depend on the ratings of the wind turbine.

In some embodiments, the tank capacity monitor 416 monitors the tank level sensor data for changes in the amount of gaseous substance in the tank wind direction and alerts the valve position decision module 402 to designated events. For example, in an embodiment, the tank capacity monitor 416 notifies the valve position decision module 402 when the amount of gas in the tank moves above or below a preselected threshold level, such as a level at which the gas is useful for driving, or helping the wind to drive, a wind turbine. In an embodiment, the tank capacity monitor 416 provides information about the amount of gas in the tank to the valve position decision module 402 to allow the valve position decision module 402 to determine if enough gas is present in the tank for proper operation, which indicates a favorable capacity condition of the gas storage tank. In an embodiment, the tank capacity monitor 416 has access to tank capacity data 420 to allow the tank capacity monitor 416 to store data regarding the volume of gas in the tank and to access data regarding tank parameters, such as tank capacity or safety limits, for example maximum capacity or maximum pressure values.

In some embodiments, the tank temperature monitor 422 monitors the tank temperature sensor data for changes in the temperature of the gaseous substance in the tank and alerts the valve position decision module 402 to designated events. For example, in an embodiment, the tank temperature monitor 422 notifies the valve position decision module 402 when the temperature of gas in the tank moves above or below a preselected threshold level, such as a level at which the temperature of the gas is cool enough to draw up heated waste gases.

In the illustrated embodiment, the valve position decision module 402 also receives user-initiated event data from a user-initiated event module 414. For example, in an embodiment, user-initiated event data includes user inputs for monitoring and controlling the wind turbine management application 400, such as adjusting settings and parameters, initiating test sequences, and forcing the valve position decision module 402 to perform tasks, for example opening valves 428A-428D to flush the tank or closing valves 428A-428D to build pressure in the tank.

In the illustrated embodiment, the valve position decision module 402 also receives wind turbine data 412 and writes updates to the wind turbine data 412. In an embodiment, the wind turbine data 412 is stored in electronic memory. In an embodiment, the wind turbine data 412 includes static data regarding the wind turbine, such as rated values for start-up and cut-in speeds. In an embodiment, the wind turbine data 412 includes operating information regarding the wind turbine, such as information regarding the current operational state, for example the fan blade angle, direction of the turbine, and the rotating speed of the turbine.

In alternative embodiments, the valve position decision module 402 can include some or all of the pre-processing monitor functionality and/or functionality performed by other elements shown in FIG. 4 and described herein but grouped differently in one or more modules. In some embodiments, the functionality described herein is distributed among a plurality of systems, which can include combinations of software and/or hardware based systems, for example Application-Specific Integrated Circuits (ASICs), computer programs, or smart phone applications.

In an embodiment, the valve position decision module 402 receives sensor data from the wind direction sensor 406, the wind speed sensor 410, the tank level sensor 418, and the tank temperature sensor 424 and processes the sensor data to determine whether to open or close each of the valves 428A-428D. In an embodiment, the valve position decision module 402 determines a degree to which open valves should be opened. In an embodiment, the valve position decision module 402 issues control signals to valve control modules 426A-426D, which drive the valves 428A-428D to respective positions as instructed by the valve position decision module 402, for example using respective linear actuators or piezoelectric devices to re-position respective valves 428A-428D.

Figure 5:
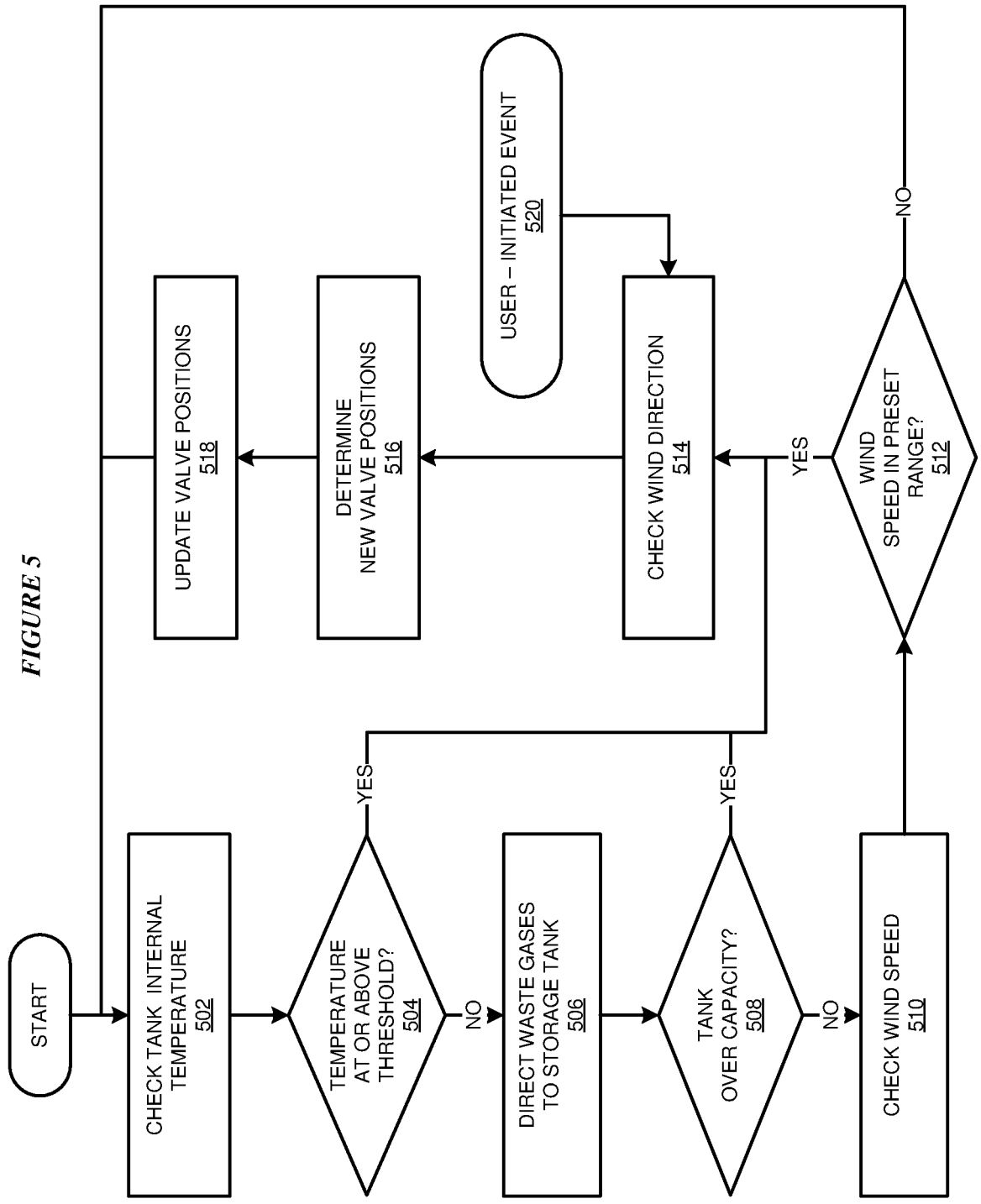
FIG. 5 depicts a flowchart of an example process for supplementing wind power for driving wind turbines in accordance with an illustrative embodiment.

With reference to FIG. 5, this figure depicts a flowchart of an example process 500 for supplementing wind power for driving wind turbines in accordance with an illustrative embodiment. In a particular embodiment, the wind turbine management application 400 carries out the process 500.

In an embodiment, at block 502, the application 400 checks an internal temperature of the gas storage tank and at block 504 the application 400 determines if the temperature is at or above a threshold temperature. In an embodiment, if the gases in the storage tank are cool, then heated gas will flow up to the tank, whereas if the gases in the storage tank are hot, then the hot gas from the tank will flow up out of the tank. Thus, if the application 400 determines that the temperature is at or above the threshold temperature, the application 400 skips ahead to block 514; otherwise, the application proceeds to block 506. In an embodiment, at block 506 the application allows waste gases to accumulate in the storage tank from various sources available in a residential or commercial building, for example from an HVAC system, a fireplace chimney, and from exhaust gases from washrooms.

In an embodiment, the gas storage tank is equipped with capacity and wind direction sensors, and a specific valve, pair of valves, or group of valves will be opened based on the wind direction. For example, if the wind direction is from east to west, only the valve or valves that allow exhaust gases to move generally east to west will be opened. Thus, in an embodiment, beginning at block 508 the application performs a series of checks on tank capacity, wind speed, and wind direction to determine if favorable conditions exist to use the waste gas to supplement wind to drive the wind turbine. More specifically, at block 508 the application checks tank capacity. If the current level of gas is at a dangerously high level, the application forgoes the wind speed check and proceeds to block 514. Otherwise at the process continues to block 510.

In some embodiments, at block 510, the application checks wind speed and at block 512 where the application determines whether the wind speed is in a preset range. For example, in some embodiments, the preset range of wind speeds includes wind speeds below the cut-in speeds by a gas compensation value, where the gas compensation value is the increase in effective wind speed when the actual wind speed is combined with gas from the storage tank. In a non-limiting example, a wind turbine has a cut-in speed of 10 mph and the waste gas compensation value is 4 mph for that particular wind turbine, so preset range of speeds is the cut-in speed (10 mph) to a wind speed that is equal to the cut-in speed reduced by the gas compensation value (10 mph−4 mph=6 mph) resulting in a preset range of 6 mph to 10 mph. In an embodiment, the preset range can include only a lower value for a system where the gas is used to supplement wind speed even when the wind speed already exceeds the cut-in speed, for example where the preset range is 6 mph or higher. In an embodiment, the preset range can include only an upper value for a system where the gas is used to supplement wind speed even during still conditions (i.e., wind speed=0 mph), for example where the preset range is any wind speed up to and including 10 mph.

At block 512, if the wind speed is not in the preset range, the application determines that favorable conditions do not exist to use the waste gas to supplement wind to drive the wind turbine, so the application starts the process over again at block 502. Otherwise, the process continues to block 514.

In some embodiments, at block 514, the application checks wind direction. Next, at block 516, the application determines new valve positions. In some embodiments, each valve has a fixed exhaust direction, which is the direction that gas flows when exiting through the respective valve. For example, in an embodiment, the exhaust directions are 0°, 90°, 180°, and 270°. In some such embodiments, at block 516, the application identifies a valve or pair of valves for which the difference between wind direction and the exhaust direction is less than 90°. In some embodiments, the application also determines a percentage-open for the valves rather than just full open or full closed. For example, in an embodiment, the application calculates a percentage-open value for each valve based on parameters such as wind speed, tank temperature, tank capacity, and angle between exhaust direction and wind direction. In some embodiments, the application uses a machine-learning model to receive various parameter values, such as wind speed, tank temperature, tank capacity, and angle between exhaust direction and wind direction, as well as other values such as humidity, blade pitch, and atmospheric pressure, as well as historic data regarding the rate at which gases in the tank are replenished, and predicts an percentage-open value for each valve. Thus, the application designates the identified valves as valves to open and designates the remaining valves as valves to close. Finally, at block 518, the application issues control signals to each of the valves to move the valves to the designated open or closed positions. The application then starts the process over again at block 502.

Also, in the illustrated embodiment, at block 520, the application receives a user-initiated event in the form of user inputs for monitoring and controlling the wind turbine management application. For example, in an embodiment, user-initiated events include inputs from a user for adjusting settings and parameters, initiating test sequences, and forcing the valve position decision module to perform tasks, for example opening valves to flush the tank or closing valves to build pressure in the tank.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
    receiving, by a processor, gas sensor data from a gas sensor that senses gas in a gas storage tank, wherein the gas sensor data describes an amount of gas in the gas storage tank;
    in response to receiving the gas sensor data from the gas sensor, identifying, by the processor, a favorable capacity condition of the gas storage tank by comparing the amount of gas in the gas storage tank to a tank capacity threshold value;
    generating, based on the comparing of the amount of gas to the threshold value, favorable capacity indicator data indicative of the favorable capacity condition of the gas storage tank;
    receiving, by the processor, wind speed data from a wind speed sensor that senses a speed of outside wind driving a wind turbine, wherein the wind speed data describes the speed of the outside wind;
    in response to receiving the wind speed data from the wind speed sensor, identifying, by the processor, a favorable wind condition of the outside wind by comparing the outside wind speed to a cut-in speed of the wind turbine;
    generating, based on the comparing of the wind speed to the cut-in speed, favorable wind indicator data indicative of the favorable wind condition of the outside wind;
    receiving, by the processor, wind direction data from a wind direction sensor that senses a direction of the outside wind, wherein the wind direction data describes the direction of the outside wind;
    in response to identifying the favorable capacity condition of the gas storage tank, identifying the favorable wind condition of the outside wind, and receiving the wind direction data from the wind direction sensor, generating, by the processor, a valve position update for a valve that controls a flow of gas from the gas storage tank, wherein the valve position update is generated by comparing a current valve position of the valve to a target valve position associated with the direction of the outside wind;
    generating, based on the comparing of the current valve position to the target valve position, valve position update data indicative of the valve position update for the valve; and
    in response to generating the valve position update for the valve, instructing, by the processor, the valve to move to the target valve position according to the valve position update data.

2. The computer implemented method of claim 1, wherein the valve is one of a plurality of valves that control the flow of gas from the gas storage tank.

3. The computer implemented method of claim 2, further comprising accessing a set of valve selection rules that each map one or more of the plurality of valves to a corresponding range of wind directions sensed by the wind direction sensor.

4. The computer implemented method of claim 3, wherein the set of valve selection rules includes a rule to open at least one of the plurality of valves, wherein the at least one of the plurality of valves is located upstream from the wind turbine between the outside wind and the wind turbine.

5. The computer implemented method of claim 4, wherein the set of valve selection rules includes a rule to close at least a second one of the plurality of valves, wherein the at least second one of the plurality of valves is located downstream from the wind turbine.

6. The computer implemented method of claim 2, further comprising:
    receiving, by the processor, updated gas sensor data from the gas sensor, wherein the updated gas sensor data describes an updated amount of gas in the gas storage tank; and
    in response to receiving the updated gas sensor data from the gas sensor, identifying, by the processor, an over-capacity condition of the gas storage tank by comparing the updated amount of gas in the gas storage tank to the tank capacity threshold value, wherein the over-capacity condition exists when the updated amount of gas in the gas storage tank exceeds the tank capacity threshold value;
    generating, based on the comparing of the updated amount of gas to the threshold value, over-capacity indicator data indicative of the over-capacity condition of the gas storage tank.

7. The computer implemented method of claim 6, further comprising:
    in response to identifying the over-capacity condition of the gas storage tank, instructing, by the processor, at least one of the plurality of valves to move to an open position.

8. The computer implemented method of claim 2, further comprising:
    receiving, by the processor, updated gas sensor data from the gas sensor, wherein the updated gas sensor data describes an updated amount of gas in the gas storage tank; and
    in response to receiving the updated gas sensor data from the gas sensor, identifying, by the processor, an under-capacity condition of the gas storage tank by comparing the updated amount of gas in the gas storage tank to a lower operating threshold value, wherein the under-capacity condition exists when the updated amount of gas in the gas storage tank is less than the lower operating threshold value;
    generating, based on the comparing of the updated amount of gas to the lower operating threshold value, under-capacity indicator data indicative of the under-capacity condition of the gas storage tank.

9. The computer implemented method of claim 8, further comprising:
in response to identifying the under-capacity condition of the gas storage tank, instructing, by the processor, at least one of the plurality of valves to move to a closed position.

10. The computer implemented method of claim 1, further comprising:
receiving, by a processor, temperature sensor data from a temperature sensor that senses a temperature of gas in the gas storage tank, wherein the temperature sensor data describes the temperature of gas in the gas storage tank; and
in response to receiving the temperature sensor data from the temperature sensor, identifying, by the processor, a favorable temperature condition of gas in the gas storage tank by comparing the temperature of gas in the gas storage tank to a gas temperature threshold value;
generating, based on the comparing of the temperature of gas to the threshold value, favorable temperature indicator data indicative of the favorable temperature condition of the gas in the gas storage tank, wherein the generating of the valve position update is further responsive to the favorable temperature indicator data.

11. A computer usable program product for a wind turbine management application, the computer program product comprising one or more computer readable storage media, and program instructions collectively stored on the one or more computer readable storage media, the program instructions executable by a processor to cause the processor to perform operations comprising:
receiving, by the processor, gas sensor data from a gas sensor that senses gas in a gas storage tank, wherein the gas sensor data describes an amount of gas in the gas storage tank;
in response to receiving the gas sensor data from the gas sensor, identifying, by the processor, a favorable capacity condition of the gas storage tank by comparing the amount of gas in the gas storage tank to a tank capacity threshold value;
generating, based on the comparing of the amount of gas to the threshold value, favorable capacity indicator data indicative of the favorable capacity condition of the gas storage tank;
receiving, by the processor, wind speed data from a wind speed sensor that senses a speed of outside wind driving a wind turbine, wherein the wind speed data describes the speed of the outside wind;
in response to receiving the wind speed data from the wind speed sensor, identifying, by the processor, a favorable wind condition of the outside wind by comparing the outside wind speed to a cut-in speed of the wind turbine;
generating, based on the comparing of the wind speed to the cut-in speed, favorable wind indicator data indicative of the favorable wind condition of the outside wind;
receiving, by the processor, wind direction data from a wind direction sensor that senses a direction of the outside wind, wherein the wind direction data describes the direction of the outside wind;
in response to identifying the favorable capacity condition of the gas storage tank, identifying the favorable wind condition of the outside wind, and receiving the wind direction data from the wind direction sensor, generating, by the processor, a valve position update for a valve that controls a flow of gas from the gas storage tank, wherein the valve position update is generated by comparing a current valve position of the valve to a target valve position associated with the direction of the outside wind;
generating, based on the comparing of the current valve position to the target valve position, valve position update data indicative of the valve position update for the valve; and
in response to generating the valve position update for the valve, instructing, by the processor, the valve to move to the target valve position according to the valve position update data.

12. The computer usable program product of claim 11, wherein the stored program instructions are stored in the one or more computer readable storage media in a data processing system, and wherein the stored program instructions are transferred over a network from a remote data processing system.

13. The computer usable program product of claim 11, wherein the stored program instructions are stored in the one or more computer readable storage media in a server data processing system, and wherein the stored program instructions are downloaded over a network to a remote data processing system for use in a computer readable storage device associated with the remote data processing system, the stored program instructions further comprising:
program instructions to meter use of the stored program instructions; and
program instructions to generate an invoice based on the metered use.

14. The computer usable program product of claim 11, wherein the valve is one of a plurality of valves that control the flow of gas from the gas storage tank, and wherein the operations further comprise:
accessing a set of valve selection rules that each map one or more of the plurality of valves to a corresponding range of wind directions sensed by the wind direction sensor,
wherein the set of valve selection rules includes a rule to open at least one of the plurality of valves, wherein the at least one of the plurality of valves is located upstream from the wind turbine between the outside wind and the wind turbine, and
wherein the set of valve selection rules includes a rule to close at least a second one of the plurality of valves, wherein the at least second one of the plurality of valves is located downstream from the wind turbine.

15. The computer usable program product of claim 11, wherein the valve is one of a plurality of valves that control the flow of gas from the gas storage tank, and wherein the operations further comprise:
receiving, by the processor, updated gas sensor data from the gas sensor, wherein the updated gas sensor data describes an updated amount of gas in the gas storage tank;
in response to receiving the updated gas sensor data from the gas sensor, identifying, by the processor, an over-capacity condition of the gas storage tank by comparing the updated amount of gas in the gas storage tank to the tank capacity threshold value, wherein the over-capacity condition exists when the updated amount of gas in the gas storage tank exceeds the tank capacity threshold value;
generating, based on the comparing of the updated amount of gas to the threshold value, over-capacity indicator data indicative of the over-capacity condition of the gas storage tank; and in response to identifying the over-capacity condition of the gas storage tank, instructing, by the processor, at least one of the plurality of valves to move to an open position.

16. The computer usable program product of claim 11, wherein the valve is one of a plurality of valves that control the flow of gas from the gas storage tank, and wherein the operations further comprise:

receiving, by the processor, updated gas sensor data from the gas sensor, wherein the updated gas sensor data describes an updated amount of gas in the gas storage tank;

in response to receiving the updated gas sensor data from the gas sensor, identifying, by the processor, an under-capacity condition of the gas storage tank by comparing the updated amount of gas in the gas storage tank to a lower operating threshold value, wherein the under-capacity condition exists when the updated amount of gas in the gas storage tank is less than the lower operating threshold value;

generating, based on the comparing of the updated amount of gas to the lower operating threshold value, under-capacity indicator data indicative of the under-capacity condition of the gas storage tank; and in response to identifying the under-capacity condition of the gas storage tank, instructing, by the processor, at least one of the plurality of valves to move to a closed position.

17. A computer system comprising a processor and one or more computer readable storage media, and program instructions collectively stored on the one or more computer readable storage media, the program instructions executable by the processor to cause the processor to perform operations comprising:

receiving, by the processor, gas sensor data from a gas sensor that senses gas in a gas storage tank, wherein the gas sensor data describes an amount of gas in the gas storage tank;

in response to receiving the gas sensor data from the gas sensor, identifying, by the processor, a favorable capacity condition of the gas storage tank by comparing the amount of gas in the gas storage tank to a tank capacity threshold value;

generating, based on the comparing of the amount of gas to the threshold value, favorable capacity indicator data indicative of the favorable capacity condition of the gas storage tank;

receiving, by the processor, wind speed data from a wind speed sensor that senses a speed of outside wind driving a wind turbine, wherein the wind speed data describes the speed of the outside wind;

in response to receiving the wind speed data from the wind speed sensor, identifying, by the processor, a favorable wind condition of the outside wind by comparing the outside wind speed to a cut-in speed of the wind turbine;

generating, based on the comparing of the wind speed to the cut-in speed, favorable wind indicator data indicative of the favorable wind condition of the outside wind;

receiving, by the processor, wind direction data from a wind direction sensor that senses a direction of the outside wind, wherein the wind direction data describes the direction of the outside wind;

in response to identifying the favorable capacity condition of the gas storage tank, identifying the favorable wind condition of the outside wind, and receiving the wind direction data from the wind direction sensor, generating, by the processor, a valve position update for a valve that controls a flow of gas from the gas storage tank, wherein the valve position update is generated by comparing a current valve position of the valve to a target valve position associated with the direction of the outside wind;

generating, based on the comparing of the current valve position to the target valve position, valve position update data indicative of the valve position update for the valve; and in response to generating the valve position update for the valve, instructing, by the processor, the valve to move to the target valve position according to the valve position update data.

18. The computer system of claim 17, wherein the valve is one of a plurality of valves that control the flow of gas from the gas storage tank, and wherein the operations further comprise:

accessing a set of valve selection rules that each map one or more of the plurality of valves to a corresponding range of wind directions sensed by the wind direction sensor, wherein the set of valve selection rules includes a rule to open at least one of the plurality of valves, wherein the at least one of the plurality of valves is located upstream from the wind turbine between the outside wind and the wind turbine, and wherein the set of valve selection rules includes a rule to close at least a second one of the plurality of valves, wherein the at least second one of the plurality of valves is located downstream from the wind turbine.

19. The computer system of claim 17, wherein the valve is one of a plurality of valves that control the flow of gas from the gas storage tank, and wherein the operations further comprise:

receiving, by the processor, updated gas sensor data from the gas sensor, wherein the updated gas sensor data describes an updated amount of gas in the gas storage tank;

in response to receiving the updated gas sensor data from the gas sensor, identifying, by the processor, an over-capacity condition of the gas storage tank by comparing the updated amount of gas in the gas storage tank to the tank capacity threshold value, wherein the over-capacity condition exists when the updated amount of gas in the gas storage tank exceeds the tank capacity threshold value;

generating, based on the comparing of the updated amount of gas to the threshold value, over-capacity indicator data indicative of the over-capacity condition of the gas storage tank; and in response to identifying the over-capacity condition of the gas storage tank, instructing, by the processor, at least one of the plurality of valves to move to an open position.

20. The computer system of claim 17, wherein the valve is one of a plurality of valves that control the flow of gas from the gas storage tank, and wherein the operations further comprise:

receiving, by the processor, updated gas sensor data from the gas sensor, wherein the updated gas sensor data describes an updated amount of gas in the gas storage tank;

in response to receiving the updated gas sensor data from the gas sensor, identifying, by the processor, an under-capacity condition of the gas storage tank by comparing the updated amount of gas in the gas storage tank to a lower operating threshold value, wherein the under-capacity condition exists when the updated amount of gas in the gas storage tank is less than the lower operating threshold value;

generating, based on the comparing of the updated amount of gas to the lower operating threshold value, under-capacity indicator data indicative of the under-capacity condition of the gas storage tank; and in response to identifying the under-capacity condition of the gas storage tank, instructing, by the processor, at least one of the plurality of valves to move to a closed position.

\* \* \* \* \*